United States Patent [19]

Inoue

[11] Patent Number: 4,902,451
[45] Date of Patent: Feb. 20, 1990

[54] METHOD OF PREPARING A FRICTIONAL MATERIAL

[75] Inventor: Kiyoshi Inoue, Tokyo, Japan

[73] Assignee: Inoue-Japax Research Incorporated, Kanagawaken, Japan

[21] Appl. No.: 668,171

[22] Filed: Nov. 2, 1984

[30] Foreign Application Priority Data

Feb. 18, 1982 [JP] Japan .................. 57-25452

[51] Int. Cl.$^4$ .............................................. B06B 3/00
[52] U.S. Cl. ................... 264/24; 252/62.55; 252/62.54; 252/62.63; 264/23; 264/25; 264/108
[58] Field of Search .............. 264/23, 24, 25, 108; 252/62.53, 62.54, 62.63

[56] References Cited

U.S. PATENT DOCUMENTS

| | | | |
|---|---|---|---|
| 3,264,716 | 8/1966 | Silver | 264/24 |
| 3,306,835 | 2/1967 | Magnus | 264/23 |
| 3,461,942 | 8/1969 | Hoffman et al. | 264/23 |
| 3,677,947 | 7/1972 | Ray et al. | 252/62.53 |
| 3,867,299 | 2/1975 | Rohatgi | 264/24 |
| 3,903,228 | 9/1975 | Riedl et al. | 264/24 |
| 4,006,479 | 2/1977 | LaCombe | 252/62.53 |
| 4,082,681 | 4/1978 | Takayama et al. | 252/62.53 |
| 4,100,087 | 7/1978 | Takayama et al. | 252/62.53 |
| 4,192,064 | 3/1980 | Kennedy | 264/23 |
| 4,278,556 | 7/1981 | Tada | 252/62.63 |
| 4,320,080 | 3/1982 | Esper et al. | 252/62.54 |

FOREIGN PATENT DOCUMENTS

| | | |
|---|---|---|
| 565556 | 3/1958 | Belgium . |
| 1544672 | 2/1969 | Fed. Rep. of Germany . |
| 1131038 | 10/1968 | United Kingdom . |
| 1206339 | 9/1970 | United Kingdom . |
| 2003088 | 3/1979 | United Kingdom . |

Primary Examiner—Paul Lieberman
Assistant Examiner—Willie J. Thompson
Attorney, Agent, or Firm—Herbert Dubno

[57] ABSTRACT

An improved method of preparing a frictional material is disclosed wherein a magnetic material is mixed in a preselected proportion with a polymeric or resinous frictional substance, the mixture while in an external magnetic field of a predetermined orientation being formed to yield the frictional material acquiring a frictional anisotropy.

18 Claims, 1 Drawing Sheet

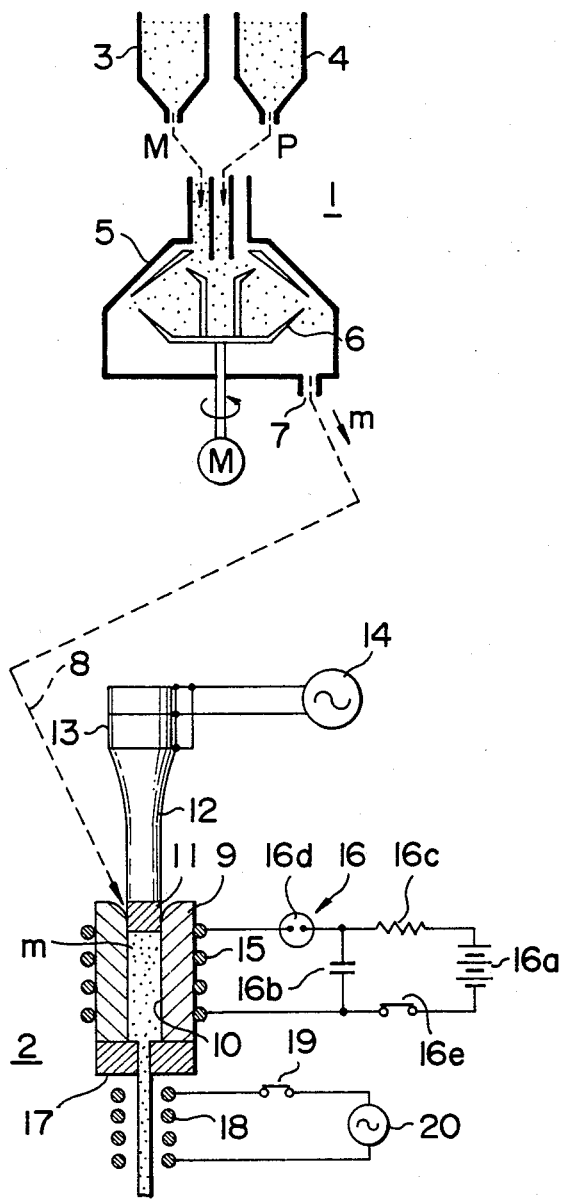

METHOD OF PREPARING A FRICTIONAL MATERIAL

This application is a continuation of prior complete application Ser. No. 466,845, filed on Feb. 16, 1983, now abandoned.

FIELD OF THE INVENTION

The present invention relates to a method of preparing a frictional material which may be used as a braking element, in bearings and in or as other mechanical parts which provide frictional or sliding surfaces or interfaces.

BACKGROUND OF THE INVENTION

While various frictional materials have been proposed heretofore with varying emphasis on properties assigned, e.g. thermal conductivity, heat-resistance, lubricity and wear resistance, resinous or polymeric materials are today in extensive use because they fairly meet these requirements. It is desirable that these materials have, inter alia, a greater coefficient of friction and enhanced wear resistance.

OBJECTS OF THE INVENTION

It is, accordingly, an important object of the present invention to provide a new and improved method of preparing a frictional material of resinous or polymeric type whereby the material acquires greater values of, inter alia, coefficient of friction and wear resistance.

SUMMARY OF THE INVENTION

According to the present invention there is provided a method of preparing a frictional material, which method comprises the steps of (a) mixing uniformly in a prescribed proportion magnetic particles i.e. particles of a magnetically susceptible substance, with a resinous frictional substance; and (b) subjecting the mixture resulting from step (a) to an external magnetic field of a predetermined orientation while forming the mixture to yield the frictional material acquiring a frictional anisotropy.

The resinous frictional substance in its formed state may comprise a resin of thermosetting type, e.g. a phenolic resin, polyimide resin, epoxy resin, polyester resin or silicone resin. Alternaively, the resinous frictional substance may comprise a resin of thermoplastic type, e.g. a polyethylene resin, nylon (polyamide) resin, acetal copolymer resin or polycarbonate resin. The resinous frictional substance may also be of crystalline type, e.g. Polytetrafruoroethylene resin, crystalline nylon, polyacetal resin or melamine resin.

In accordance with a specific feature of the invention, the uniform mixture of magnetic particles with the resinous substance is subjected to the external magnetic field while being heated in step (b).

Specifically, step (b) may comprise: (b1) cold-shaping the mixture under pressure in the external magnetic field to form a compacted body of the mixture of predetermined configuration and size; and (b2) subsequently heating the body to allow the resinous substance in pulverulent form to coalesce and the magnetic particles to be bonded together and to the coalescing resinous particles to yield the said frictional material.

Alternatively, step (b) may comprise (b1') cold-shaping the mixture under pressure to form a compacted body of the mixture of predetermined configuration and size; and (b2') subsequently heating the body in the external magnetic field to allow the resinous substance in pulverized form to coalesce and the magnetic particles to be bonded together and to the coalescing resinous particles in a said predetermined orientation to yield the said frictonal material.

Still alternatively, step (b) may comprise: warm-shaping the mixture at an elevated temperature under pressure in the external magnetic field to yield the formed body constituting the frictional material.

The external magnetic field of predetermined orientation is preferably of periodically or aperiodically varying intensity and may have a field strength ranging between 1000 and 10,000 Gauss, although in practice a field strength not greater than 6000 Gauss is satisfactory.

The magnetic particles are preferably composed at least in part of an iron oxide which may be $\gamma$-ferric oxide ($Fe_2O_3$), ferrous oxide ($Fe_3O_4$) or ferriferrous oxide.

In the mixing stage, one or more further substances may be incorporated into magnetic particles and these may be barium sulfate, zinc oxide, silicon oxide, calcium oxide, aluminum oxide, copper, steel (iron), aluminum, lead, graphite, molybdenum disulfide and/or asbestos (silicate minerals).

BRIEF DESCRIPTION OF THE DRAWING

These and other features of the present invention as well as advantages thereof will become more readily apparent from the following description of certain embodiments thereof when taken with reference to the accompany drawing in which the sole FIGURE is a schematic view partly in section diagrammatically illustrating an apparatus for carrying out a method according to the present invention.

SPECIFIC DESCRIPTION

The apparatus illustrated basically comprises a mixing stage 1 and a forming stage 2. In the mixing stage 1, hoppers 3 and 4 supply a magnetic (magnetically susceptible) material M in a finely divided, powdery form and a polymeric frictional material P likewise in a finely divided, powdery form, respectively, which are fed in a preselected proportion into a kneading machine 5 of conventional design including a rapidly revolving agitator blade arrangement 6. The kneading machine 5 thus causes the magnetic particles M and polymeric particles P in the desired proportions to be uniformly mixed together to yield at its outlet 7, a mass m of the homogeneous combination of magnetic material M and polymeric material P.

The polymeric material P may be phenol, polyimide, polyester and/or silicone resins, polyethylene, nylon, acetal copolymer and/or polycarbonate resins, polytetrafluoroethylene, crystalline nylon, polyacetal and/or melamine resins.

Typical examples of the magnetic material M are gamma ferric oxide ($\gamma$-$Fe_2O_3$), ferrous oxide ($Fe_3O_4$) and ferricferrous oxide. The magnetic material may also be barium oxide, a manganese-aluminum alloy, an iron-chromium-cobalt alloy, an iron-chromium-vanadium alloy, a copper-nickel-iron alloy, a copper-nickel-cobalt alloy, an aluminum-nickel-cobalt-iron alloy, a magnetic steel or a rare-earth alloy.

In the mixing state 1, a further substance may also be added from an additional hopper (not shown) and this further substance may include barium sulfate, zinc oxide, silicon oxide, calcium oxide, aluminum oxide, copper, steel, aluminum, lead, graphite (carbon), molybdenum disulfide and/or asbestos.

The mass m is then conveyed along a line 8, e.g. on a moving belt, to the forming stage 2 which here comprises a compaction and extrusion mold 9 adapted to receivethe mass m in its cavity 10.

In the forming stage 2, a vertically movable punch 11 is positioned to penetrate slidably into the cavity 10 from the upper-end opening of the mold 9 to compress the mass m in the cavity under pressure applied downwardly by a press (not shown). The punch 11 shown here is a vibratory punch carried by a horn 12 having an electromechanical transducer 13 attached at its upper end, which is energized by a high-frequency power source 14 in a conventional manner to impart to the punch 11 mechanical oscillations in a sonic or ultrasonic range.

The mold 9 is shown as having a coil 15 wound therearound to apply a magnetic field to the mass m being compacted by the punch 11 in the cavity 10. The coil 15 is energized by a power supply 16. The coil 15 and the power supply 16 constituting a magnetic-field generator may be replaced by a permanent magnet.

In the electromagnetic field-generating system, while the power supply 16 may be a continuous-DC source so that the generated magnetic field has a constant field strength over time, it has been found that the magnetic field should, preferably, be of a periodically or an aperiodically varying field strength, e.g. in the form of a pulsed DC magnetic field applied repetitively.

Thus, the coil 15 is preferably energized with a succession of impulsive currents furnished by a suitable pulsing source 16, which may comprise a DC source 16a and a capacitor 16b as shown. The capacitor 16b is charged by the DC source 16a via resistor 16c to store a predetermined charge thereon. The discharge circuit for the capacitor 16b which connects it to the coil 15 is shown containing a switch 16d of breakdown type so that when the terminal voltage of the capacitor 16b exceeds the breakdown voltage, the switch 16d is rendered conductive and the charge on the capacitor 16b is impulsively discharged through the coil 15 which in turn causes an impulsive magnetic field to be generated through the mass m in the cavity 10. Thus, a succession of magnetic pulses is created through the mass m as long as an operating switch 16e in the charging circuit of the capacitor 16b is closed.

The compaction and extrusion mold 9 is formed at its lower end with a die opening 17 through which the mass m in the cavity 10 is extruded. The mass m forced through and out of the die opening 17 is then passed through a heating coil 18 surrounding the exit passage of the die and energized via an operating switch 19 by a high-frequency power supply 20 for polymerization of the mass m to yield a frictional material.

It should be noted that the heating of the mass may also be carried out simultaneously with the compaction thereof in the mold 9. In this case, the heating coil 18 is wound around the mold 9, the mass m subjected to simultaneous compaction and heating is allowed to cool while passing through and out of the die opening 17 to yield a desired frictional material.

In the forming stage 2, the powdery mass m of magnetic particles M and polymeric base material P uniformly combined in the first stage 1 is loaded in the cavity 10 of the mold 9 where it is compacted with or without simultaneous heating thereof while it is subjected to a strong external magnetic field applied by the coil 15. The magnetic field is of a field strength (magnetic flux density) of 1000 to 10,000 Gauss although in practice up to 6000 Gauss has been found to be sufficient. In this case, the punch 11 and the lower end 17 of the mold 9 are constituted by a magnetically permeable material so that the field generated by the coil 15 is uniformly concentrated through the mass m in the cavity. Thus, a powerful magnetic orientation of the magnetic material M and hence the corresponding orientation of the molecules of the resinous polymeric material P in the body m is achieved to yield the frictional material of high frictional anisotropy. This is especially accentuated when the magnetic field is applied to the mass while being heated or polymerized. As described previously, the external magnetic field is here applied in the form of a succession of magnetic impulses derived from the impulsive electrical source 16. By means of the pulsed field application, greater magnetic drive pressures and the resulting rapid change of the field gradient with time are repeatedly generated to facilitate the orientation of the magnetic particles M in the mass m. In addition, the punch 11, equipped with the vibration arrangement 12, 13 applies to the mass m oscillatory mechanical impacts which, combined with the pulsed field application, serve to facilitate the mechanical and magnetic anisotropic compaction or consolidation of the mass m.

EXAMPLE I

A mixture of 60% by volume $Fe_2O_3$, 3% by volume graphite and the balance polytetrafluoroethylene is formed while being heated at a conventional polymerization temperature of the latter for a period of 12 hours respectively under and without an external magnetic field of 2000 Gauss in a given direction to yield two products A and B of frictional material respectively. The products A and B are measured of tensile strengths ($Kg/cm^2$), frictional coefficients and wear amounts (mg/500 m), giving the following values:

TABLE 1

| | Tensile strength | Frictional Coefficient tested under a pressure of 6 $kg/cm^2$ | | Wear amount at a PV value of 100 $kg/cm^2 \cdot cm/sec$ |
|---|---|---|---|---|
| | | velocity 1 cm/sec | velocity 100 cm/S | |
| A | 200 $kg/cm^2$ | 0.25 | 0.26 | 0.25 mg/500 m |
| B | 640 $kg/cm^{2*1}$ | $0.52^{*2}$ | $0.4^{*2}$ | 0.08 mg/500 m |

In Table 1 above, the value*1 represents one measured in the direction in which the magnetic field is applied and the values*2 represent ones measured with the pressure applied perpendicular viz. ones measured between the surfaces urged together in a direction perpendicular, to the direction of the magnetic field.

It has also been found that there is a correlation between an increase in magnetic permeability ($\mu$) of a resinous frictional material (b) formed under a magnetic field over that formed with no external magnetic field (a) and a reduction in wear of the material (b) from the material (a). Thus, in general it has been observed that when the magnetic permeability ($\mu$) is increased by 1.8 L times, the wear is reduced to one fifth.

EXAMPLE II

Two bearing products are prepared from phenol, one (a1) without and one (b1) with 6% by volume of $\gamma$-$Fe_2O_3$. The product (b1) is formed under an external magnetic field of 5000 Gauss. The bearing products a1 and b1 are subjected to wear tests by being moved in water at 7 m/sec under a load of 4 kg/cm$^2$ in sliding contact with a carbon steel material for a period of 10 hours. The product a1 shows a wear of 0.02 mm whereas the product b1 shows a wear of 0.002 mm. A corresponding improvement is achieved in frictional coefficient.

EXAMPLE III

Two bearing products are prepared from polyethylene, one (a2) without and one (b2) with 6% by volume of $\gamma$-Fe$_2$O$_3$. The product (b2) is formed under an external magnetic field of 5000 Gauss. The bearing products a2 and b2 are subjected to wear tests by being moved in water at 7 m/sec under a load of 4 kg/cm$^2$ in sliding contact with a carbon steel material for a period of 10 hours. The product a2 shows a wear of 0.034 mm whereas the product b2 shows a wear of 0.022 mm. A corresponding improvement in frictional coefficient is achieved.

EXAMPLE IV

Two mechanical rotary sliders are prepared from Nylon 6 (trade name), one (a3) without and one (b3) with 6% by volume $\gamma$-Fe$_2$O$_3$. The product (b2) is formed under an external magnetic field of 5000 Gauss. The rotary sliders are subjected to wear tests by being rotated at 35 Km/hour under a torque of 2.5 kg-cm in sliding contact with a cast iron material for a period of 20 hours. The products a3 shows a wear of 0.08 mm whereas the products b3 shows a wear of 0.012 mm. A corresponding improvement in frictional coefficient is achieved.

What is claimed is:

1. A method of preparing a member operating as a machine part with a surface in frictional sliding contact with another part in a machine, the method comprising the steps of:
   (a) mixing uniformly in a preselected proportion magnetic particles with a resinous frictional substance;
   (b) subjecting the mixture resulting from step (a) to an external magnetic field while shaping the mixture to form said member with said surface, said magnetic field being oriented, relative to said mixture being shaped to form said member, in a predetermined directional relationship with said surface of said member and having a magnetic-field strength sufficient for said member to acquire a maximum frictional anisotropy having an extreme value of frictional coefficient in the direction of said surface, by
      (b1) cold-shaping said mixture under pressure in said external magnetic field to form a compacted body of the mixture of predetermined configuration and size, and
      (b2) subsequently heating the body to allow the resinous substance in pulverized form to coalesce and said magnetic particles to be bonded together and to said coalescing resinous particles to yield said frictional material.

2. A method of preparing a member operating as a machine part with a surface in frictional sliding contact with another part in a machine, the method comprising the steps of:
   (a) mixing uniformly in a preselected proportion magnetic particles with a resinous frictional substance;
   (b) subjecting the mixture resulting from step (a) to an external magnetic field while shaping the mixture to form said member with said surface, said magnetic field being oriented, relative to said mixture being shaped to form said member, in a predetermined directional relationship with said surface of said member and having a magnetic-field strength sufficient for said member to acquire a maximum frictional anisotropy having an extreme value of frictional coefficient in the direction of said surface, by
      (b1') cold-shaping said mixture under pressure to form a compacted body of the mixture of predetermined configuration and size; and
      (b2) subsequently heating the body in said magnetic field to allow the resinous substance in pulverized form to coalesce and said magnetic particles to be bonded together and to said coalescing resinous particles in a said predetermined orientation to yield said frictional material.

3. A method of preparing a member operating as a machine part with a surface in frictional sliding contact with another part in a machine, the method comprising the steps of:
   (a) mixing uniformly in a preselected proportion magnetic particles with a resinous frictional substance;
   (b) subjecting the mixture resulting from step (a) to an external magnetic field while shaping the mixture to form said member with said surface, said magnetic field being oriented, relative to said mixture being shaped to form said member, in a predetermined directional relationship with said surface of said member and having a magnetic-field strength sufficient for said member to acquire a maximum frictional anisotropy having an extreme value of frictional coefficient in the direction of said surface by (b1') cold shaping said mixture under pressure to form a compact body off the mixture of predetermined configuration and size; and (b2) subsequently heating the body in said magnetic field to allow the resinous substance in pulverized form to coalesce and said magnetic particles to be bonded together and to said coalescing resinous particles in a said predetermined orientation to yield said frictional material, said magnetic field having a field strength of 1000 to 10,000 Gauss, and being of periodically or aperiodically varying field strength.

4. The method defined in claim 3 wherein step (b) comprises: warm-shaping said mixture at an elevated temperature under pressure in said external magnetic field to yield the formed body constituting said frictional material.

5. The method defined in claim 1, 2 or 3 wherein said magnet particles consist at least in part of an iron oxide.

6. The method defined in claim 5 wherein said iron oxide is ferric oxide (Fe$_2$O$_3$).

7. The method defined in claim 6 wherein said oxide is $\gamma$ ferric oxide.

8. The method defined in claim 5 wherein said iron oxide is ferrous oxide (Fe$_3$O$_4$).

9. The method defined in claim 5 wherein said iron oxide is ferriferrous oxide.

10. The method defined in claim 1, 2 or 3, further comprising, in step (a), adding to said magnetic particles at least one further substance selected from the group which consists of barium sulfate, zinc oxide, silicon oxide, calcium oxide, aluminum oxide, copper, steel, aluminum, lead, graphite, molybdenum disulfide and asbestos.

11. The method defined in claim 1, 2 or 3, further comprising the steps of: imparting sonic or ultrasonic vibrations to said mixture while in said external magnetic field.

12. The method defined in claim 1 or 2 wherein said magnetic field has a field strength of 1000 to 10,000 Gauss.

13. The method defined in claim 1, 2 or 3 wherein said frictional substance comprises a thermosetting resin.

14. The method defined in claim 13 wherein said theremosetting resin includes at least one substance selected from the group which consists of phenolic resin, polyimide resin, epoxy resin, polyester resin and silicone resin.

15. The method defined in claim 1, 2 or 3 wherein said frictional substances comprises a thermoplastic resin.

16. The method defined in claim 15 wherein said thermoplastic resin includes at least one substance selected from the group which consists of polyethylene resin, polyamide resin, acetal copolymer resin and polycarbonate resin.

17. The method defined in claim 1, 2 or 3 wherein said frictional substance comprises a crystalline resin.

18. The method defined in claim 1, 2 or 3 wherein said crystalline resin includes at least one substance selected from the group which consists of polytetrafluoroethylene resin, crystalline nylon, polyacetal resin and melamine resin.

* * * * *